June 23, 1942. W. A. YONKERS 2,287,075
VENT VALVE
Filed July 15, 1939 3 Sheets-Sheet 3

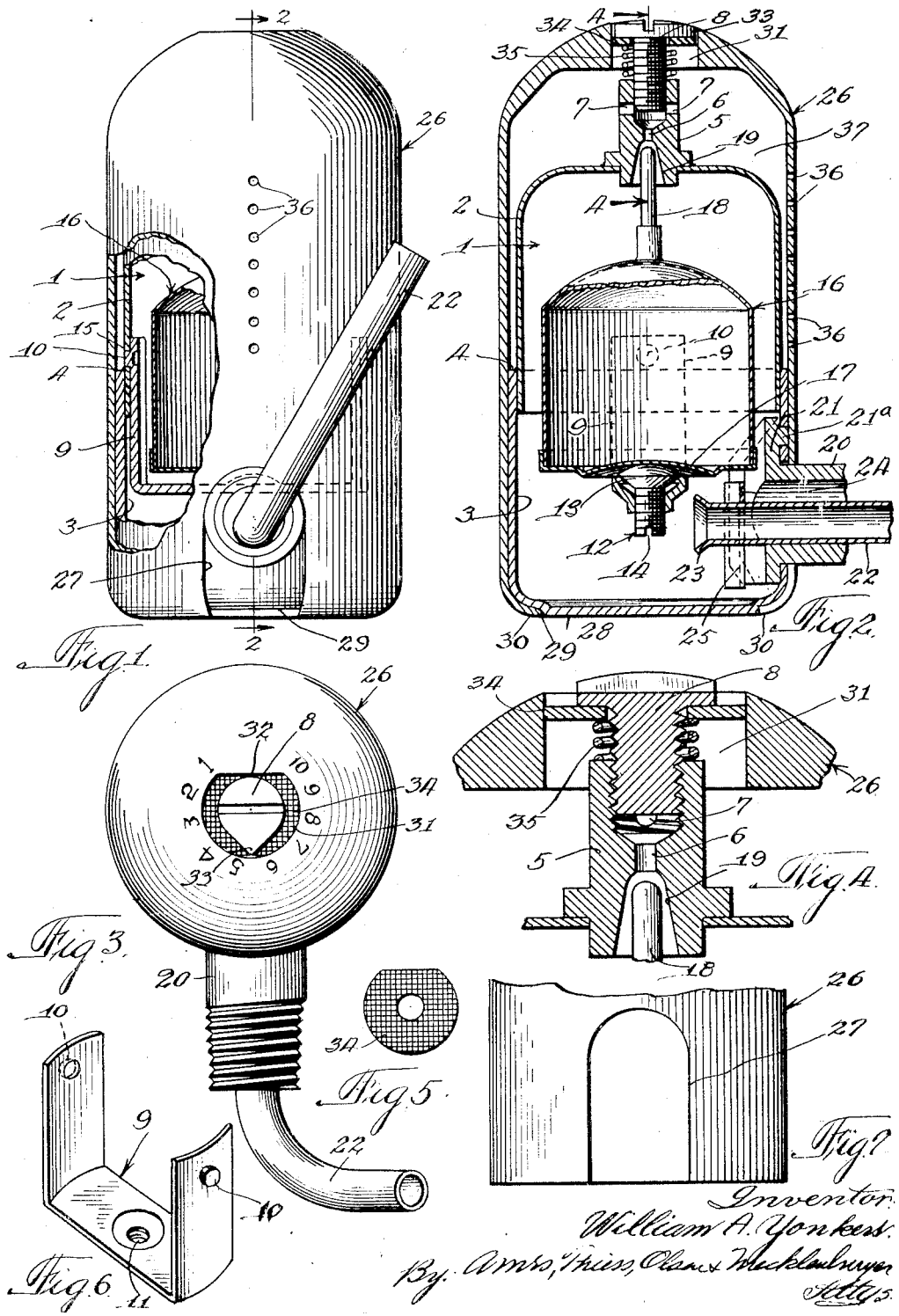

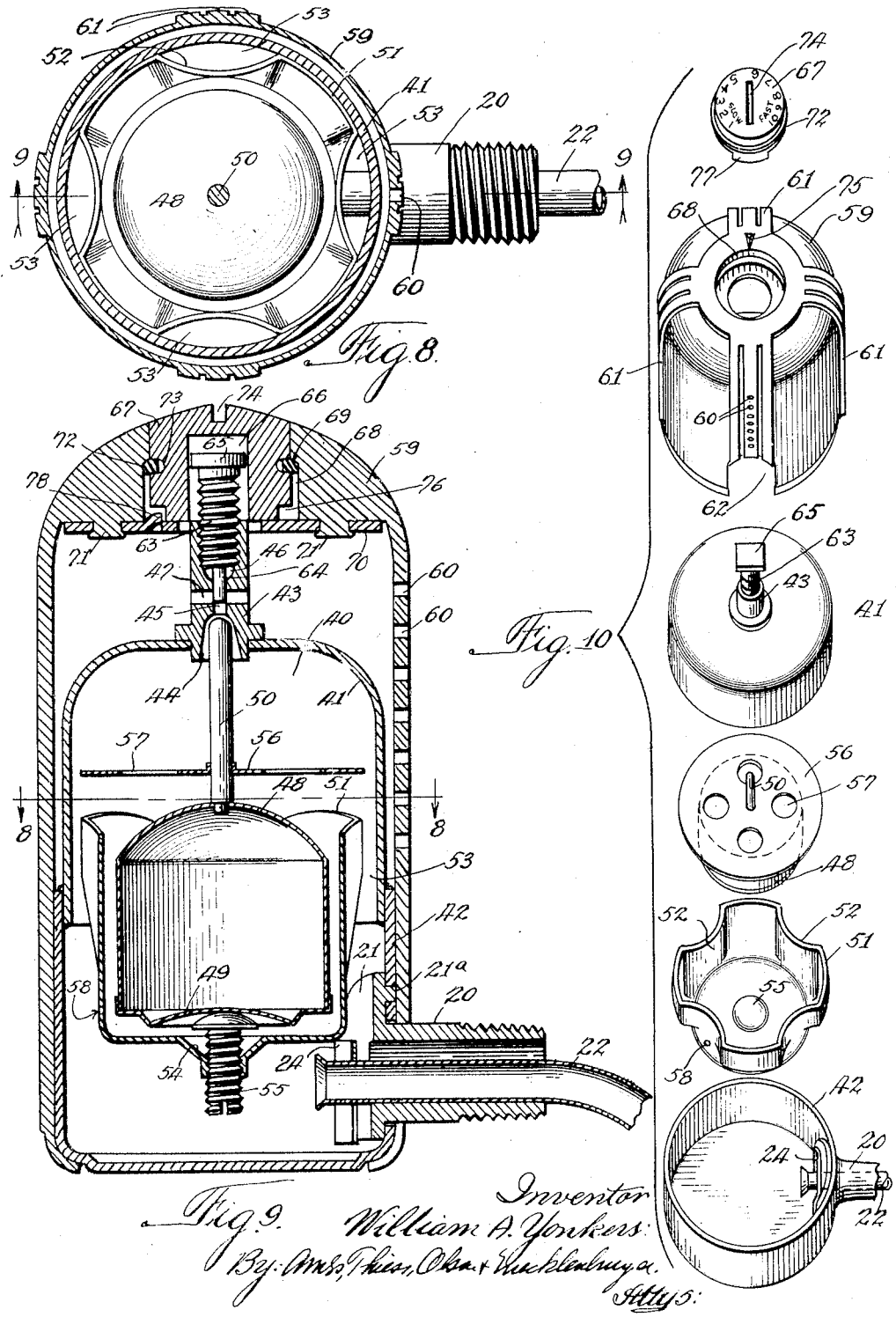

Inventor
William A. Yonkers

Patented June 23, 1942

2,287,075

UNITED STATES PATENT OFFICE 2,287,075

VENT VALVE

William A. Yonkers, Chicago, Ill., assignor to Jas. P. Marsh Corporation, Chicago, Ill., a corporation of Illinois Application July 15, 1939, Serial No. 284,596

18 Claims. (Cl. 236—64)

This invention relates to valves, more particularly to vent valves for radiators and the like for use in connection with steam or hot water heating systems whereby air may rapidly be eliminated from the system and the valves may operate automatically to prevent the escape of steam or water, and the invention has for an object the provision of highly efficient, inexpensive, and rugged valve devices of this character.

One of the objects of the invention is to provide a vent valve having adjustable float means for controlling the vent in which the float means is expansible for closing the vent in response to predetermined temperatures within the valve chamber.

It is also an object to provide a valve of the character described in which the position of the float with respect to the vent may accurately be adjusted before assembly, and wherein the adjusting means is inaccessible after the valve has been permanently assembled.

Another object is the provision of an automatic vent valve having adjustable means for varying the size of the vent opening within predetermined limits and in which any desired adjustment may permanently be retained. The vent control may accurately be reset to any previous setting or to any desired setting in accordance with indicia positioned relative to predetermined vent dimensions.

It is also an object to provide a sectional valve body in which one of the sections is provided with a vent opening and means to support the associated float, with means for adjusting the float relative to the vent opening, and also in which the adjusting mechanism is inaccessible when the sections are secured together to form the float chamber.

Another object is to provide a new and novel means for reducing the noise incident to the valve operation. The usual vent valves are a constant source of annoyance and irritation on account of the hissing noise of the air as it escapes from the vent. In the present invention this annoyance is substantially entirely eliminated, and a so-called muffler chamber may be incorporated with the valve structure without adding materially to the expense thereof.

A further object is the provision of a vent valve in which the position of a temperature responsive float may accurately be adjusted with respect to the vent before permanent assembly of the valve body, and in which the entire structure may involve a minimum number of easily assembled parts which may quickly and easily be assembled and which will not easily get out of order in use.

The valve preferably comprises a double shell construction in which air is vented into the compartment between the shells, where it expands and leaves noiselessly through a number of small discharge ports in the outer shell, whereby all venting noise is eliminated. Also, any venting rate from the smallest to the greatest capacity of the valve is obtained by merely turning an exteriorly accessible indicator or dial relative to clearly marked co-operating indicators or dials on the top of the valve shell. The combined adjusting and indicating screw in the embodiment shown is housed entirely within the contour of the outer shell in all positions of adjustment and thus eliminates otherwise unsightly projections from the valve casing.

A still further object of this invention is the provision of a vent valve of the character hereinbefore mentioned, having surge-responsive means for controlling the vent independently of the flotation and temperature-responsive means, and including means for retaining the flotation-responsive means in vent-closing position, after operation thereto, until substantially all of the liquid accumulated in the valve chamber has been discharged therefrom.

Additional objects will be apparent from the specification and the appended claims.

In the drawings:

Figure 1 is a rear elevation of one embodiment of the invention, a portion being broken away for purposes of illustration;

Fig. 2 is a vertical sectional view through the embodiment shown in Fig. 1, and is taken on a line substantially corresponding to line 2—2 of Fig. 1;

Fig. 3 is a top view of the embodiment shown in Fig. 1;

Fig. 4 is an enlarged sectional view through the vent adjusting mechanism, and is taken on a line substantially corresponding to line 4—4 of Fig. 2;

Fig. 5 is a plan view of the friction washer used in connection with the vent adjusting screw;

Fig. 6 is a perspective view of the float-supporting yoke;

Fig. 7 is a fragmentary view of the bottom end of the outer casing before being secured in position, and illustrates the inverted U-shaped opening through which the threaded nipple or so-called spud extends for supporting the valve;

Figs. 8 and 9 are, respectively, horizontal and vertical sectional views illustrating another form of vent valve embodying the invention, Fig. 8 being taken along the line 8—8 of Fig. 9, and Fig. 9 being taken along the line 9—9 of Fig. 8;

Figures 11, 12, 13, 14:
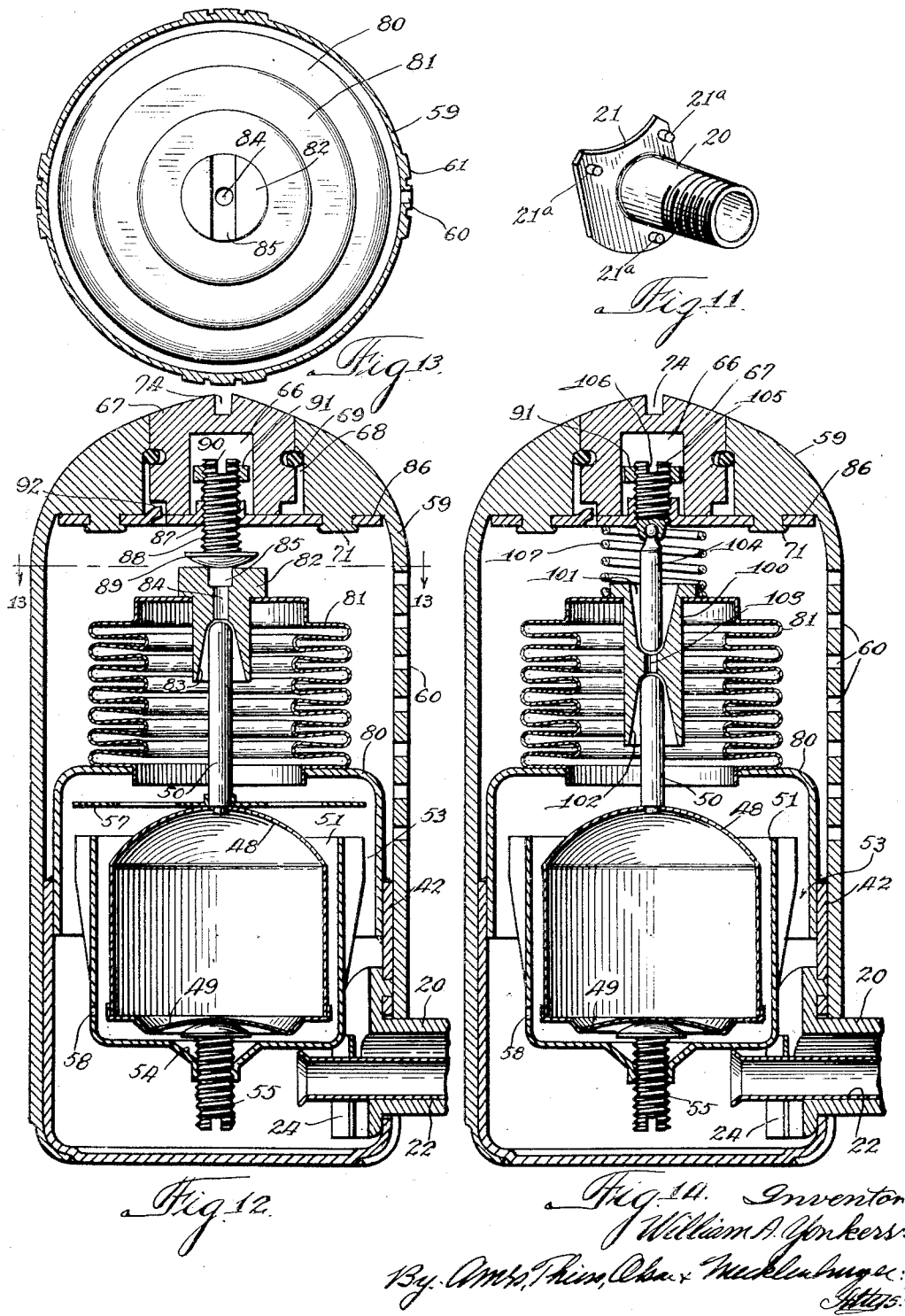

Fig. 10 is a view in exploded perspective illustrating the constructional details of the various parts employed in the embodiment shown in Figs. 8 and 9;

Fig. 11 is a detail perspective view of a nipple or spud preferably employed in vent valves embodying the invention;

Fig. 12 is a sectional elevational view illustrating a still further embodiment of the invention;

Fig. 13 is a horizontal sectional view taken along the line 13—13 of Fig. 12; and Fig. 14 is a sectional elevational view similar to Figs. 9 and 12 illustrating an additional embodiment of the invention.

Referring first to Figs. 1 to 7, inclusive, of the drawings, the embodiment there illustrated comprises a valve chamber 1 which is formed of two cup-shaped sheet metal members 2 and 3, which are arranged to telescope each other as shown, and which are permanently secured together and sealed at 4 by any suitable means, preferably by soldering or a similar securing and sealing method. The upper member 2 constitutes the vent section of the chamber 1 and is provided with an axially positioned upwardly extending vent nipple or body 5 having an axial passage 6 therethrough, the upper portion of which is threaded as shown, the body 5 also being provided with a transverse passage 7 so as to form a pair of lateral vent openings. The threaded portion of the passage 6 is provided with an adjusting screw 8 for controlling the size of the vent openings. The vent nipple 5 is preferably inserted in an axial opening in the cup-shaped member 2 and is soldered or brazed therein or secured in any other suitable leakproof manner. This vent adjusting mechanism will be described in detail later.

An inverted U-shaped yoke 9 is adapted to be inserted in the cup-shaped member 2, as shown in Figs. 1 and 2, and is preferably formed substantially as illustrated in perspective in Fig. 6. This yoke may comprise a sheet metal strap having upwardly extending ends which conform substantially to the inner diameter of the cup-shaped member 2. An outwardly extending lug 10 is positioned adjacent the upper end of each yoke arm as shown, and these lugs are preferably formed integral with the yoke. The cross bar of the yoke is provided with an axially positioned countersunk threaded opening 11 to receive an adjusting screw 12. The upper end of this adjusting screw is preferably provided with a rounded head 13, and the lower end is provided with a slot 14 whereby a screw driver may be used for adjustment.

During assembly, the arms of the yoke may be inserted in the cup member 2, and the resilience of the yoke arms will cause the lugs 10 to enter and be retained in suitable oppositely disposed complementary openings 15 in the cup-shaped member 2, so that the yoke forms a transversely extending support adjacent the open end of the member 2. A float 16, which may be of the usual hollow sheet metal type having an expansible, preferably corrugated, bottom wall 17, is supported on the head of the screw 12 as in Fig. 2. The float 16 is provided with an upwardly extending valve stem or needle 18 at its upper end which extends into a tapered guide opening 19 in the nipple or valve body 5. The stem 18 is arranged to control the vent opening in response to expansion or flotation of the float member 16. The float preferably contains a small amount of volatile liquid in order to insure the rapid expansion thereof and effect closing of the vent when a predetermined temperature exists in the valve chamber. The lower wall 17 of the float is preferably of thin material and corrugated or otherwise shaped somewhat as illustrated in order to permit considerable rapid expansion thereof.

The lower cup member or base 3 which constitutes the base or inlet section of the valve chamber 1 is provided with a laterally extending inlet spud 20 which may be threaded, as shown in Fig. 3, to enable the device to be attached to a radiator or other part of a heating system. The spud 20 as shown best in Fig. 11 is preferably provided at its inner end with a flange 21 having lugs 21a thereon adapted to enter suitable complementary openings in the lower cup-shaped member 3, whereby the spud is accurately positioned relative to the casing. The spud may be secured in place by soldering or other suitable means. The valve is also provided with a so-called siphon 22, which may be of the usual type, one end of which extends through the spud 20 and is provided with an outturned flange 23. A sheet metal member 24 is provided with a slot 25 to receive the end of the siphon, whereby the siphon is rotatably retained in position. This sheet metal member 24 is preferably soldered or otherwise secured to the spud flange 21, as shown in Fig. 2. The siphon which is of the curved type is shown extending angularly upward in Fig. 1 solely for convenience in illustration.

In assembling the device, the float 16 is positioned in the upper cup-shaped member 2 with the vent controlling stem 18 in position to control the vent opening, as shown. The arms of the yoke 9 are then inserted and the lugs 10 are snapped into the complementary openings 15 in the member 2, and the float 16 will then be supported upon the head of the adjusting screw 12. The subassembly in this form may be placed in a testing device and the screw 12 may accurately be adjusted to cause the float to close the valve at a predetermined temperature. A drop of solder may be used on the screw 12 to retain it in adjusted position, but this is ordinarily not required, as it is retained by friction. After the adjustment and test have been made, the lower cup-shaped portion or base 3 is telescoped over the upper portion 1 and may then be sealed thereto by soldering or otherwise securing the joint at 4. The openings 15 to receive the yoke lugs 10 are preferably positioned immediately above the open end of the lower cup member or closely adjacent thereto, substantially as shown in Fig. 1, so that a single soldering operation not only will secure the two cup-shaped members together, but also will solder the lugs into the openings 15 to thereby completely seal the chamber except for the inlet and the outlet vent.

An outer housing or casing 26 is arranged to telescope downwardly completely over the valve chamber, as shown, and is provided at its lower end with an inverted U-shaped opening 27 on one side to provide clearance for the inlet spud 20. The upper edge of this U-shaped opening is accurately located so as to provide a stop against the spud to limit the downward telescoping of the housing. The bottom of the lower cup-shaped member 3 is preferably depressed, as shown at 28, to form an annular shoulder 29.

After the outer housing is fully telescoped over the valve, the lower edges are rolled or crimped over the bottom edge of the lower cup section 3 to form a smooth rounded corner, as shown at 30. This provides a completely enclosed double shell structure having no outwardly extending projections except the inlet spud 20 and the associated siphon 22.

The upper end of the outer casing 26 is provided with an axial opening 31 to receive the upper end of the vent adjusting screw 8. This opening is provided with a flat side 32, as shown in Fig. 3, and the head of the adjusting screw 8 is laterally extended to provide a pointer portion 33 which co-operates with suitable indicia (Fig. 3) disposed on the casing 26 adjacent the edges of the opening. The pointer portion of the head of the screw, when turned to the limit in either direction, will engage the flat side 32 of the opening and prevent further rotation of the screw in the same direction. A friction washer 34 is positioned under the head of the screw 8, and a compression spring 35 is mounted on the shank so as firmly to press the washer 34 against the head and assist in retaining the screw in any adjusted position. The washer 34 is substantially the same size and shape as the opening 31 and snugly fits therein, whereby it closes the opening and is retained against rotation, and the upper surface of this washer is preferably of a contrasting color to the head of the screw so that the pointer head of the adjusting screw is clearly visible.

Before the outer shell or casing 26 is positioned on the valve, the screw 8 may be adjusted in the vent body 5 so that rotation of the screw adjusts the size of the vent opening through a predetermined vent controlling range, which range is limited by the flat side of the opening 32 after the casing 26 is assembled on the valve chamber. This range is ordinarily such that when the screw is turned to the limit in one direction, a minimum vent opening is provided, and when the screw is turned to the limit in the opposite direction, a maximum vent opening is provided. It is not ordinarily desired to completely close the vent opening, but only to vary the size thereof.

Preferably, the indicia on the casing 26 and the pointer head of the screw 8 are so related that the maximum vent opening is indicated thereby when the lower end of the screw 8 occupies its mid-position in the transverse vent passage 7, and as the screw 8 is rotated in a clockwise direction, as viewed in Fig. 3, progressively to indicate decreasing vent openings approaching the minimum vent position, the lower end of the screw 8 moves downwardly so as progressively to decrease the size of the vent opening formed by the passage 7. A particular advantage of this adjusting arrangement is that the progressive decrease in the size of the vent opening bears a substantially straight line relation to the rotation of the screw 8, so that the indicia on the casing 26 may be arranged at uniformly spaced intervals about the opening 31 to indicate equal increments of adjustment.

As shown, the casing 26 is longer than the valve chamber and telescopes snugly over the lower member 3 with its side walls spaced from the upper member 2 so as to provide an exhaust chamber 37 around the vent openings 7 and extending downwardly around the valve chamber.

The casing 26 is provided with a plurality of small discharge ports or perforations 36 which are arranged at progressively increasing distances from the vent openings. In the present embodiment, seven small perforations are arranged in vertically spaced relation in one wall of the casing.

Air or other fluid discharged from the vent opening 7 expands in the muffler chamber 37 and is accordingly exhausted at reduced velocities from the ports 36. Since these ports are arranged at progressively increasing distances from the vent openings, unequal velocities of flow exist at the different ports, and the tendency of the exhaust fluid to produce audible sound is thus reduced. Furthermore, such sound as is produced at the vent opening 7 is effectively dissipated by the construction of the casing 26 and the arrangement of the ports 36.

While the casing or housing 26 may be formed of any suitable material and may be of any desired shape without departing from the principles of this invention, it is preferable, for best results, to form the casing 26 from some relatively soft, non-resonant metal, such as aluminum, zinc, or copper, aluminum being preferred since it is a very poor conductor of sound. Furthermore, it is preferable to provide the casing with a relatively thick upper wall adjacent the vent opening, as shown best in Figs. 2 and 4. Provision of an aluminum casing of such construction augments the sound-dissipating and eliminating characteristics of the muffler chamber 37 and the exhaust ports 36, the nonresilient character of the material and the thick upper wall tending to reduce so-called sympathetic vibration of the casing. Furthermore, the ports 36, by reason of their small diameters and their longitudinal arrangement at progressively increasing distances from the vent openings, tend to round-off the sharp wave fronts of the sound waves initiated at the vent openings and thus further assist in providing a noiseless construction.

An additional advantage of the thick upper wall on the casing 26 is that sufficient adjusting space is provided within the confines of the wall itself so that the movable elements of the adjusting mechanism, including the washer 34 and the head of the screw 8, are positioned entirely within the contour of the casing and within the confines of the thick upper wall in all positions of adjustment of the vent openings. Thus unsightly projections from the valve casing are eliminated.

It will be apparent that the vent valve construction illustrated in Figs. 1 to 7, inclusive, provides a large float chamber having plenty of space for air and water separation so as to minimize to a large degree float bobbing and spitting. Positive float action and quick response to temperature are assured so that the vent is immediately closed when steam reaches the float chamber. Any venting rate from minimum to maximum is obtained by merely turning the indicating screw 8 to a desired point around its clearly marked dial. An inexpensive, easily assembled, double shell construction is provided in which the air is vented into the compartment between the shells, where it expands and leaves noiselessly through the plurality of small discharge ports.

The embodiment of the invention illustrated in Figs. 8, 9, and 10 is in many respects similar to the embodiment heretofore described, and is intended for use under similar conditions in connection with similar steam heating systems. This second embodiment, however, incorporates various refinements not included in the embodiment illustrated in Figs. 1 to 7, inclusive, and the nature and function of these refinements will now be described.

As shown best in Fig. 9, the valve chamber 40 is formed of two cup-shaped members 41 and 42 which are arranged to telescope each other and to be permanently sealed together by soldering or similar sealing means. As in the embodiment heretofore described, the upper cup-shaped member 41 constitutes the vent section of the valve chamber and is provided with an axially positioned upwardly extending vent valve body or nipple 43 having a tapered valve seat 44, an axially extending passageway 45, the upper end of which is enlarged and threaded as at 46, as shown, and a transverse passage 47 which intersects the axial passage 45 so as to form lateral vent openings which communicate with the exterior of the valve chamber 40. Likewise, the lower cup-shaped member or base member 42 is similar to the base member 3 of Fig. 2 in that it is provided with an inlet spud 20 of the type shown in Fig. 11 adapted to be accurately positioned and secured to the member 42 by integrally formed lugs or rivets 21a, and having associated therewith a siphon 22 and a siphon supporting member 24 identical with the corresponding elements heretofore described.

Within the valve chamber 40 is arranged a flotation and temperature-responsive element 48 which is substantially identical with the heretofore described element 16 in that it is provided with an expansible bottom wall 49 and it is adapted to be filled with a suitable volatile liquid, the upper wall of the element 48 carrying a valve stem or needle 50 which extends into the tapered valve seat 44 of the valve body or nipple 43 and is arranged to control the vent opening in response to the expansion or flotation of the float element 48.

In this embodiment of the invention there is also provided a transverse support carried by the upper cup-shaped member 41 for adjustably supporting the flotation and temperature-responsive element 48, but in this embodiment the transverse support comprises a cup-shaped member 51 adapted to fit snugly within the cup-shaped member 41, as shown best in Fig. 8, portions of the walls of the cup member 51 being indented or corrugated, as indicated by the reference numerals 52, so as to provide passageways 53 which establish communication between the inlet at the bottom of the valve chamber 40 and the vent outlet at the top of the valve chamber 40. As shown, the bottom wall of the cup-shaped member 51 is provided with a countersunk threaded opening 54 for receiving an adjusting screw 55, the head of which is adapted to support the flotation and temperature-responsive element 48 within the cup-shaped member 51 so that the stem 50 is in controlling relation to the vent openings in the vent body 43.

It will be apparent that in so far as its supporting and adjusting functions are concerned, the cup-shaped member 51 is substantially the equivalent of yoke member 9 provided in the embodiment of the invention shown in Figs. 1 to 7, inclusive, and in assembling the device constituting the embodiment of this invention, the float element 48 is positioned within the cup-shaped member 51 and an arbor press used to press the cup-shaped members 51 and 41 into predetermined telescoping relation so that the float element is supported upon the head of the adjusting screw 55. As heretofore described, this subassembly may then be placed in a testing device and the screw 55 accurately adjusted to cause the float to close the vent opening at a predetermined temperature, the cup-shaped members 41 and 51 being permanently secured together by sweating or soldering, and a drop of solder being placed on the screw 55 to retain it in its adjusted position if desired. After the subassembly has thus been completed and adjusted, the lower cup-shaped member 42 may be telescoped over the cup-shaped member 41 and sealed thereto by soldering or other suitable securing methods, and it will be observed that the adjusting screw 55 is thus rendered inaccessible for further adjustment so as to prevent tampering therewith.

When vent valves of the type heretofore known in the art are applied to the radiators or heat transfer units of steam heating systems, it is found that a sudden surge of the heating medium within the radiator may take place so as to cause a high velocity flow of steam, air, and water into the valve, and unless the vent is quickly closed under such conditions spitting of the valve will occur, water and steam being discharged from the vent opening. In order to prevent such objectionable action, the cup-shaped member 51 is arranged as heretofore described to provide passageways 53 through which fluid flows between the inlet and the vent outlet of the valve chamber 40, and a baffle member 56 is provided on the valve stem 50 arranged so that the outer edges of the baffle extend over the passageways 53 and are disposed in the path of the fluid flowing therethrough. Thus, upon the occurrence of a sudden surge or a high velocity flow of fluid through the passages 53, the impact of the fluid on the baffle 56 is effective to raise the float member 48 and the valve stem 50 independently of the flotation and temperature conditions existing within the valve so as to close the vent opening and prevent spitting of the valve.

As shown in Figs. 8 and 9, the cup-shaped member 51 surrounds the float element so as to form a float chamber of restricted capacity, and it will be apparent that upon the accumulation of liquid within the cup-shaped member 51, the float 48 will be operated to close the vent opening. Accumulation of liquid in the cup member 51 may occur due to the deflecting action of the baffle 56 which tends to deflect entrained liquid in the fluid flowing through the passages 53 so that this liquid accumulates in the float chamber formed by the member 51. Condensation of steam in the upper portion of the valve chamber 40 will also result in accumulation of liquid within the cup 51, and it will be observed that the baffle 56 is provided with a plurality of apertures 57 which permit the condensate to enter the cup member 51 from the upper end thereof. Provision of the restricted capacity float chamber formed by the cub-shaped member 51 is highly effective in preventing bobbing of the float due to sudden changes in the liquid level within the valve chamber, or due to surges.

As shown, the cup-shaped member 51 is provided with a small aperture 58 adjacent the bottom thereof, through which aperture liquid accumulated in the cup member 51 may return to the lower portion of the valve chamber 40, wherefrom it is discharged through the siphon 22. It will be apparent that the portion of the cup-shaped member 51 below the aperture 58 is at all times filled with liquid, and accordingly a very small additional amount of liquid will effect flotation of the member 48 so as to close the vent opening. Thus, upon a sudden surge of the fluid flowing through the passages 53 of sufficient velocity to effect operation of the baffle 56 so as to close the vent opening, there may be a considerable quantity of entrained liquid deflected into the cup-shaped member 51, and the consequent rise in the level of the liquid within the float chamber formed by the member 51 will serve to hold the vent closed for a short interval following such a high velocity surge.

Whenever the liquid level in the valve chamber 40 rises above the aperture 58, liquid flows therefrom through the aperture in the cup-shaped member 51 so as to raise the float 48 and effect closure of the vent opening—if the vent is not already closed due to temperature conditions existing within the valve chamber. The capacity of the aperture 58 is considerably less than the drainage capacity of the siphon 22, and accordingly when conditions are such that liquid is being withdrawn from the valve chamber through the siphon tube at a greater rate than it is being accumulated therein so that the liquid level falls below the aperture 58, liquid drains from the float chamber formed by the cup member 51 at a rate which is less than the rate of discharge of liquid from the valve chamber. Therefore, sufficient liquid will be maintained in the cup-shaped member 51 to maintain the vent closed until substantially all of the liquid within the valve chamber 40 has been withdrawn through the siphon 22. This insures that when the liquid level within the valve chamber 40 has fallen approximately to that level at which the vent would open if the cup-shaped member 51 were not provided, sudden changes in the liquid level will not effect bobbing of the float since sufficient liquid is retained in the cup member 51 to hold the float 48 and the valve stem 50 firmly in their respective vent-closing positions.

The outer shell or enclosing casing provided in the embodiment of the invention shown in Figs. 8, 9, and 10 is, in general, similar to the outer shell or casing 26 of Fig. 2, and preferably comprises an aluminum shell or casing 59 having a thick upper wall and relatively thin side walls in which a plurality of sound-absorbing apertures 60, similar to the apertures 36 in the previously described embodiment, are provided. As shown best in Figs. 8 and 10, the shell or casing 59 is provided with strengthening ribs 61 which extend longitudinally of the casing over substantially the entire length thereof and impart an artistic appearance to the casing. As in the previously described embodiment of the invention, the casing is provided at its lower end with a notch 62 adapted to receive the inlet spud 20 when the casing 59 is telescoped over the valve chamber, the upper end of the notch 62 contacting the upper surface of the spud 20 so as to form a predetermined stop properly to position the outer shell or casing, the lowermost edges of the casing 59 then being pressed inwardly as by a spinning or other suitable forming operation so as tightly to engage suitable shoulders on the cup 42 and firmly secure the outer shell in predetermined relation with respect to the valve chamber 40.

The vent adjusting means provided in this embodiment of the invention is in principle similar to the heretofore described embodiment, but differs therefrom in constructional details and comprises an adjusting screw 63 which threadedly engages the enlarged threaded portion 46 in the vent body 43, the screw 63 having an extending smaller portion 64 which projects into the intersection of the passages 45 and 47. At its upper end, the screw 63 is provided, as shown, with a square head 65 adapted to be received within a similarly shaped aperture 66 in an adjusting knob or button 67. As shown, the adjusting button 67 is entirely received within an aperture 68 formed in the thick upper wall of the outer shell 59, and is supported by a plate 70 secured to the lower surface of the upper wall by rivets 71 that are preferably formed integrally with the shell or casing 59.

In order releasably to retain the adjusting knob or button 67 within the aperture 68, the aperture is provided with an annular shoulder 69, and a resilient split ring 72 is positioned in an annular groove 73 extending about the circumference of the adjusting button 67 so that when the adjusting knob or button is inserted into the aperture 68 from the upper end thereof, the resilient ring 72 expands and engages the shoulder 69 to prevent accidental removal of the adjusting knob 67 from the apertures 68.

When the adjusting knob 67 is rotated within the aperture 68, it effects corresponding rotation of the screw 63 so as to move the projecting end 64 of the screw across the transverse passage 47, thereby varying the size of the vent opening; and it will of course be apparent that the variation of the vent opening thus obtained bears the same straight line relation to the rotation of the screw 63 and the adjusting knob 67 as is obtained by the adjusting means provided in the previously described embodiment of the invention.

As shown, the aperture 66 in the adjusting knob 67 within which the square head 65 of the screw 63 is received, permits axial movement of the screw during the adjusting operation, the adjusting knob and the head of the screw being positioned within the confines of the thick upper wall at all points of adjustment. In order to provide for ready adjustment of the knob or button 67, a slot 74 is provided in the upper surface thereof for receiving a suitable instrument, such as a screw driver, and circumferentially arranged indicia are provided on the upper surface of the knob 67, as shown in Fig. 10, for co-operating with a pointer 75 on the upper surface of the casing 59 to indicate fractional adjustments of the vent opening. In order to limit the rotation of the adjusting knob 67 and the screw 63 to a predetermined range of vent adjustment, the knob 67 is provided at its lower edge with an annular groove 76 (Fig. 9) and a lug 77 (Fig. 10). The lug 77 extends into the groove 76 for engaging a stop 78 consisting of a finger that is struck upwardly from the supporting plate 70, as shown best in Fig. 9.

The embodiments of the invention thus far described constitute air vent valves adapted for use with the usual steam heating system operating at superatmospheric pressures, and it will be apparent that vent valves embodying this invention provide for thorough, rapid, and noiseless venting of air from the radiators while utilizing a minimum number of parts which may be economically and quickly manufactured and which may be readily assembled and adjusted to form a highly efficient and permanently accurate unit. In Figs. 12 and 13 a further embodiment of the invention is shown comprising a vacuum type air venting valve which is similar to the previously described embodiments in that it utilizes a number of similar or identical parts to which similar reference numerals are applied. As shown best in Fig. 12, the upper cup-like member which forms the vent section of the valve chamber in this embodiment differs from the rigid members 2 and 41 of Figs. 2 and 9, respectively, in that it comprises a lower rigid section 80 and an upper expansible section or bellows 81. Supported on the top wall of the bellows section 81 is a valve body 82 having a tapered valve seat 83 therein adapted to be engaged by the valve stem 50 of flotation and temperature-responsive means that are identical with those shown in Figs. 8, 9, and 10, and comprise a flotation member 48 having an expansible bottom wall 49, a surge responsive baffle member 57, and a cup-shaped supporting member 51 which forms a flotation chamber and serves to direct the fluid medium upwardly through the valve chamber in predetermined paths. Extending from the tapered valve seat 83 in the vent valve body 82 is a vent passage 84 which intersects a transversely extending groove 85 in the top of the body 82.

Secured to the lower surface of the thick top wall of the outer shell or casing 59 is a supporting plate 86 that is similar to the supporting plate 70 of Fig. 9, except that the plate 86 is provided with an axially located threaded aperture 87 for adjustably supporting a threaded member 88, the lower end of which is provided with an enlarged head 89 adapted to be engaged by the vent body 82 so as to limit the expansion of the bellows member 81. Normally, so long as the pressure within the valve chamber is equal to or greater than atmospheric pressure, the bellows members 81 maintains the vent body 82 in contact with the head 89 of the adjustable member 88 and a vent opening is thus provided, the size of which depends upon the spacing of the valve stem 50 from the vent valve seat 83. This spacing may of course be increased or decreased simply by rotating the adjustable member 88 so as to advance or retract the head 89 which effects a corresponding movement of the valve body 82.

As shown, the upper end of the threaded member 88 is provided with a slot 90 for receiving a screw driver or some similar instrument, by means of which the element 88 may initially be adjusted so as to provide a maximum vent opening. After such initial adjustment has been made, a suitable nut 91, which is of square or other noncircular configuration, is adjusted on the upper end of the element 88 and permanently secured thereto by a drop of solder or similar means, so that when the adjusting knob or button 67 is inserted into the aperture 68 in the upper wall of the casing 59 and over the nut 91 or the element 88, the cooperating indicia on the upper surfaces of the adjusting knob 67 and the casing 59 will be properly positioned to indicate a maximum vent opening. It will of course be understood that the cavity 66 in the adjusting knob 67 has the same shape as the nut 91, and accordingly the position of the nut 91 determines the position of the adjusting knob 67 in the aperture 68. The knob 67 in this embodiment of the invention is identical with the knob 67 heretofore described in connection with Figs. 8, 9, and 10, and is similarly retained in the aperture 68 by an expansible ring 69, the supporting plate 86 being provided with a stop finger 92 corresponding to the stop finger 78 of Fig. 9.

As will be understood by those skilled in the art, the valve construction illustrated in Figs. 12 and 13 is adapted for use with steam heating systems which operate under a partial vacuum or at subatmospheric pressures. The partial vacuum or subatmospheric pressure is of course obtained by initially filling the entire system with steam and by then reducing the rate of steam generation so that it is less than the rate of condensation in the radiators. The differential in condensation thus produced of course lowers the pressure and temperature of the steam throughout the system to a point where the rate of condensation is equal to the rate of steam generation and thus maintains a subatmospheric pressure or partial vacuum. As soon as the pressure within the system drops below atmospheric, the bellows member 81 contracts and carries the valve body 82 downwardly until the valve seat 83 engages the valve stem 50 so as to prevent air from entering the radiator or heat transfer unit through the vent opening. During the initial filling operation, and during any subsequent periods wherein the pressure is increased to atmospheric pressure or above, the bellows member 81 occupies its normal expanded position and accordingly any air in the system is driven out through the vent openings, the entry of steam into the valve chamber following the venting operation being effective to operate the temperature-responsive element 48 so that the diaphragm 49 expands and effects closure of the vent opening.

As heretofore explained, the rate of venting and the size of the vent opening may be varied from a minimum to a maximum by rotating the adjusting knob 67 so as to extend or withdraw the adjusting member 88 and move the valve member 82 toward or away from the valve stem 50. In order to insure that the vent opening will be closed by the temperature and flotation-responsive means upon the existence of predetermined temperature conditions within the valve chamber, even though the adjusting means is positioned for a maximum vent opening, the adjusting means must be so correlated with the temperature-responsive means as to insure that the maximum expansion of the bellows member 81 is always less than the movement provided by expansion of the diaphragm 49.

The further embodiment of the invention illustrated in Fig. 14 is adapted for use in hot water heating systems and is of the general type, and is particularly useful in air venting systems of the type described and claimed in a copending application Serial No. 196,170, filed March 16, 1938, which issued as Patent No. 2,224,929, December 17, 1940, in the name of Alexander D. Rose and the present applicant, which application is entitled "Air venting apparatus," and which is assigned to the same assignee as the present invention. As will be apparent upon inspection, the embodiment illustrated in Fig. 14 is composed principally of parts similar to those utilized in the embodiment of Figs. 12 and 13, the baffle member 57 being omitted, and the vent valve body 82 of Figs. 12 and 13 being replaced by a somewhat different vent valve body 100 which is provided with upper and lower tapering valve seats 101 and 102 connected by a vent passage 103. Co-operating with the upper valve seat 101 is a stem or needle 104 that in addition to its valve-closing function, act as a stop to limit the upward movement of a bellows portion 81 of the valve chamber, which bellows portion carries the valve body 100.

As shown, the valve stem 104 is provided at its upper end with a ball member adapted to engage a suitable socket in an adjusting screw 105 that is threadedly supported in the plate 86. The ball and socket joint thus provided ensures that the stem 104 will properly engage the seat 101 under all conditions. The adjusting screw 105 is similar to the adjusting member 88 of Fig. 12 in that it is provided with a slot 106 in its upper end for receiving a screw driver or similar instrument whereby initial adjustment of the vent opening may be accomplished, and with a nut 91 which may be properly adjusted thereon in order to provide accurate positioning of the indicia on the adjusting knob 67 and the casing 59 so as properly to indicate the degree of vent opening.

A coil spring 107 is arranged, as shown, with its upper end engaging the supporting plate 86 and its lower end engaging the top wall of the bellows 81, the strength of the coil spring 107 being correlated to the resiliency of the bellows 81 so that the valve body 100 is maintained in the open vent position shown when the heating system to which the inlet spud 20 is connected is empty, or when the water level in the radiator and the valve chamber is low and the pressure in the system is also low.

Since both the valve stems 104 and 50 serve to restrict the flow of air through the vent opening 103 with the parts in the position shown in Fig. 14, it will be apparent that movement of the adjusting knob 67 so as to retract the valve stem 104 from the seat 101 serves to decrease the flow resistance and thus provides for an increased venting rate. As more fully explained in the above referred to Rose and Yonkers application, when the water level in the radiator reaches its normal level, the water level in the valve chamber rises to a position such that the flotation element 48 effects upward movement of the valve stem 50 and closes the vent opening so as to prevent the escape of water therethrough. This closure of the vent opening occurs regardless of the pressure conditions within the heating system and the valve chamber. Upon increase of the pressure in the heating system, the pressure within the valve chamber is correspondingly increased and accordingly the upper wall of the bellows member 81 moves upwardly so as tightly to seal the vent opening against the valve stem 104. If the water level or the temperature in the valve chamber is sufficiently high, the flotation member 48 will also operate to move the valve stem 50 upwardly and provide a double seal of the vent opening, but it will be apparent that the vent opening will be maintained closed by the valve stem 104 so long as the pressure remains within the normal range, even though the radiator to which the valve chamber is connected should become airbound, under which conditions the water level and temperature of course decrease so as to permit the float element 48 to drop and move the valve stem 50 away from the tapered seat 102. As explained in the above-identified Rose and Yonkers application, upon the occurrence of such airbound conditions, venting of the radiator may be effected simply by momentary decreasing the pressure so as to permit the bellows 81 to contract and move the valve body 103 to its normal position shown in Fig. 14 to open the vent passageway.

It will now be apparent that vent valves embodying the present invention may be utilized in various types of heating systems to provide efficient and noiseless venting of air from such systems, and that the varying types of vent valves required by particular systems may all be constructed from similar parts so as to provide easily assembled low cost constructions, the finished valves having a pleasing appearance and being highly efficient in operation.

While I have shown particular embodiments of my invention, it will be understood of course that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. A vent valve comprising a cup-like base section including an inlet, a cup-like vent section having an axially located vent at its closed end and adapted to be secured to said base section to form a valve chamber, said vent section including axially expansible wall portions for bodily moving said vent, means for limiting the expansion of said vent section, an adjusting screw axially supported from said vent section outwardly of the open end thereof, condition-responsive means having an over-all length substantially greater than the maximum distance between the open end of said vent section and said vent disposed between said screw and said vent in controlling relationship with said vent, contraction of said wall portions being effective to close said vent independently of conditions affecting said condition-responsive means, said screw being adjustable to predetermine the controlling relationship of said condition-responsive means to said vent and to the expansion of said vent section prior to assembly of said base section with said vent section.

2. A vent valve comprising a chamber having an inlet and a vent outlet, flotation and temperature-responsive means in said chamber for controlling said vent outlet, and surge-responsive means for closing said vent outlet independently of flotation and temperature conditions affecting said flotation and temperature-responsive means.

3. A vent valve comprising a chamber having an inlet and a vent outlet, flotation and temperature-responsive means for closing and opening said vent outlet in accordance with the temperature and quantity of the fluid medium entering said chamber through said inlet, and means responsive to sudden surges of said entering fluid medium for closing said vent outlet independently of flotation and temperature conditions affecting said flotation and temperature-responsive means.

4. A vent valve comprising a valve chamber having a bottom inlet and a top vent, a transverse support intermediate the ends of said chamber, a temperature and flotation-responsive element within said chamber, adjustable means on said support for supporting said element in predetermined controlling relationship to said vent, said transverse support including means for directing entering fluid upwardly from said inlet in predetermined paths, and means interposed in said paths for closing said vent in response to surges in the fluid flowing along said paths independently of temperature flotation conditions affecting said temperature and flotation-responsive element.

5. A vent valve comprising two cup-like sections adapted to have their open ends sealed together to form a valve chamber, one of said sections having a vent outlet for said chamber and the other of said sections having an inlet, a valve member for closing said vent outlet, float means connected to said valve member for operating the same to control said vent outlet, a supporting member secured to said one section and extending transversely of said valve chamber, adjustable means extending through said member for adjustably supporting said float means and said valve member between said supporting member and said vent outlet in predetermined relationship to said vent outlet, said adjustable means being readily accessible when said supporting member and said one section are initially assembled and being inaccessible when said other section is telescoped thereover and sealed to said one section to form said valve chamber, said supporting member being shaped to permit the flow of fluid medium between said inlet and said vent outlet within said valve chamber, and impact means connected to said valve member above said float means and positioned in the flow path formed by said supporting member for closing said vent outlet in response to sudden surges in the fluid flow through said path.

6. A vent valve comprising a first cup-shaped member having a vent outlet in the end wall thereof, a second cup-shaped member fixedly positioned in and extending outwardly from the open end of said first member in inverted relation with respect thereto, adjustable means extending through the end wall of said second member, flotation and temperature-responsive means having an over-all length greater than the depth of either of said cup-shaped members supported on said adjustable means within said second member and including a valve stem extending from said flotation and temperature-responsive means in controlling relation to said vent outlet, a third cup-shaped member telescoped over said second member and having its open end sealed to said first member to render said adjustable means inaccessible and to form a valve chamber, said third member having an inlet in one wall thereof and said second member being so related to said first and third members as to provide a passageway therebetween for the flow of fluid between said inlet and said vent outlet, and an impact member positioned above the upper end of said second cup-shaped member in the path of fluid flowing through said passageway and connected to said valve stem for actuating said valve stem to close said vent outlet upon the occurrence of sudden surges in the flow of said fluid.

7. A vent valve comprising a valve chamber having a top vent and a bottom inlet, a cup-shaped member in said chamber intermediate the ends thereof and spaced from the walls of said chamber throughout at least a portion of its circumference to provide passage means between said member and the wall of said chamber through which fluid may pass from said inlet to said vent, said member facing said vent and forming a flotation chamber of small capacity, flotation-responsive means in said flotation chamber for controlling said vent, baffle means movably supported above said cup-shaped member and said passage means for closing said vent in response to a high velocity flow of fluid through said passage means, said baffle means serving to deflect said flow of fluid whereby liquids entrained in said fluid collect in said flotation chamber to cause said flotation-responsive means to maintain said vent closed for a predetermined time following a high velocity surge of the fluid through said passage means, said flotation chamber having a drainage aperture of restricted capacity in the lower portion thereof.

8. A vent valve comprising a valve chamber having a bottom inlet and a top vent, said chamber having axially expansible wall portions for bodily moving said top vent in response to pressure differentials between the interior and exterior of said chamber, means for limiting the expansion of said wall portions, an adjustable support in said chamber, a vent-controlling temperature and flotation-responsive element positioned on said support for adjustment to predetermine the controlling relation of said element to said vent and to predetermine the size of said vent opening, said element being positioned to limit the contraction of said wall portions, and means including a rotary member for adjusting said expansion limiting means to vary the size of said vent opening predetermined by said temperature and flotation-responsive means.

9. A vent valve comprising a tubular valve chamber having a bottom inlet and an axial top vent, an adjustable support in said chamber, a vent-controlling temperature and flotation-responsive element positioned on said support for adjustment to predetermine the controlling relationship of said element to said vent, and a tubular casing of greater length than said chamber telescoped over said valve chamber to provide a muffler chamber into which said vent discharges, a side wall of said casing being provided with a plurality of discharge ports remote from said vent.

10. A vent valve comprising a tubular valve chamber having a bottom inlet and an axial top vent, an adjustable support in said chamber, a vent-controlling temperature and flotation-responsive element positioned on said support for adjustment to predetermine the controlling relationship to said vent, a tubular casing of greater length than said chamber telescoped over said chamber and spaced from the top wall and at least a portion of the side walls of said chamber to provide a muffler chamber around said vent, a side wall of said casing being provided with a plurality of discharge ports remote from said vent, and rotatable means substantially within the contour of said casing and accessible from outside said casing for varying the size of said vent.

11. A vent valve comprising a tubular vent chamber having a bottom inlet and an axial top vent, an adjustable support in said chamber, a vent-controlling temperature and flotation-responsive element positioned on said support for adjustment to predetermine the controlling relationship to said vent, a tubular casing spaced from the top wall and at least a portion of the side walls of said chamber to provide a muffler chamber around said vent, a side wall of said casing being provided with a plurality of discharge ports at progressively increasing distances from said vent, an axial rotary member for varying the size of said vent opening, said casing having an axial passage therethrough to receive said rotary member, said rotary member and said opening co-operating to limit the rotary movement, and means to indicate predetermined settings of said rotary member.

12. A vent valve comprising a chamber having a vent passage therethrough, condition-responsive means in said chamber for controlling said vent passage, and an enclosing shell surrounding said chamber and said vent passage to form an expansion chamber for fluid medium discharged from said vent passage, said shell being formed of relatively non-resonant material to minimize vibrations thereof and having openings in one wall at progressively increasing distances from said vent passage for exhausting at various reduced velocities said fluid medium discharged into said shell from said vent passage.

13. A vent valve comprising a chamber having a vent passage therethrough, condition-responsive means in said chamber for controlling said vent passage, and an enclosing shell of greater length than said chamber surrounding said chamber and enclosing said vent passage, said shell having a thick end wall adjacent said vent passage and relatively thin side walls secured to said chamber adjcent the opposite end whereby vibration of said shell is minimized, said shell forming a muffler chamber in which fluid medium discharged from said vent passage may expand and having a series of openings in said side walls progressively remote from said vent passage for exhausting said fluid medium.

14. A vent valve comprising a chamber having a vent passage in one wall, condition-responsive means in said chamber for controlling said vent passage, and an aluminum shell surrounding said chamber to form an expansion chamber for fluid medium discharged from said vent passage, said shell having a relatively thick end wall adjacent said vent passage for minimizing vibration of said shell and having a series of apertures in one wall arranged at progressively increasing distances from said vent passage for exhausting said fluid medium at various reduced velocities.

15. In a vent valve, the combination with a tubular valve chamber having a valve-controlled vent opening at one end thereof, of a tubular housing of greater length than said chamber telescoped over said chamber to form a muffler chamber surrounding said one end and extending along the sides of said valve chamber providing for the expansion of fluid medium discharged from said vent opening into said muffler chamber, said housing having a plurality of exhaust ports arranged in axially spaced relation to each other at progressively increasing distances from said vent opening for exhausting said fluid medium at various reduced velocities.

16. A vent valve comprising a cup-like base having an inlet, an inverted cup-like upper member having a vent in its closed end and telescoped into said base to form a valve chamber, a U-shaped yoke having its free ends provided with lugs engaged in lateral openings in the side walls of said upper member above the telescoped portions and adjacent the open end of said base whereby said base and upper member and said yoke may be soldered together and the chamber sealed in a single soldering operation, said U-shaped yoke extending downwardly into said cup-like base, an adjusting screw in said yoke within said base, and a condition-responsive float supported on said screw partially within each of said cup-like members for controlling said vent.

17. In an air vent valve having a valve chamber, a valve body secured to a wall of said chamber having a vent opening and an adjusting member cooperating with said valve body for varying the size of said opening, the combination of an outer housing telescoped over said valve chamber and valve body having a thick end wall and an aperture in said thick wall into which said adjusting member extends, and means disposed in said aperture and entirely within the confines of said thick wall for effecting movement of said adjusting member, said means and the outer surface of said wall having co-operating indicia for indicating fractional adjustment of said vent opening.

18. In an air vent valve having a valve chamber, a valve body secured to a wall of said chamber having a vent opening and an adjusting screw for varying the size of said opening, the combination of an outer housing telescoped over said valve chamber and valve body having a thick end wall and an aperture in said thick wall into which said adjusting screw extends, a non-circular head on said screw, an adjusting knob disposed in said aperture entirely within the confines of said thick wall and having a pocket for receiving said non-circular head of said adjusting screw whereby rotation of said knob effects rotation of said adjusting screw, and means for releasably retaining said adjusting knob in said aperture, said knob and said housing having co-operating indicia on the outer surfaces thereof for indicating fractional adjustment of said vent opening.

WILLIAM A. YONKERS.